United States Patent
Daul et al.

(10) Patent No.: US 9,371,674 B2
(45) Date of Patent: Jun. 21, 2016

(54) ROTARY HYDRAULIC DAMPER FOR PIVOTING STOWAGE BIN

(71) Applicant: ITT Manufacturing Enterprises, LLC, Wilmington, DE (US)

(72) Inventors: Terrance E. Daul, Hamburg, NY (US); Jeffrey T. Kelly, Orchard Park, NY (US); John M. Janak, West Seneca, NY (US); Timothy J. Boerschig, Amherst, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 330 days.

(21) Appl. No.: 13/796,002

(22) Filed: Mar. 12, 2013

(65) Prior Publication Data

US 2013/0247330 A1    Sep. 26, 2013

Related U.S. Application Data

(60) Provisional application No. 61/615,620, filed on Mar. 26, 2012.

(51) Int. Cl.
*E05D 11/00* (2006.01)
*E05D 11/06* (2006.01)
*F16F 9/12* (2006.01)
(Continued)

(52) U.S. Cl.
CPC ............... *E05D 11/00* (2013.01); *E05D 11/06* (2013.01); *E05F 3/14* (2013.01); *F16F 9/12* (2013.01); *F16F 9/145* (2013.01); *E05Y 2900/538* (2013.01); *Y10T 16/54* (2015.01)

(58) Field of Classification Search
CPC ........... E05D 11/00; E05D 11/06; E05F 3/14; F16F 9/145; F16F 9/12; Y10T 16/54; E05Y 2900/538

See application file for complete search history.

(56) References Cited

U.S. PATENT DOCUMENTS 4,411,341 A * 10/1983 Schultz ..................... 188/310
5,887,930 A *  3/1999 Klein ..................... 296/37.12
6,082,507 A    7/2000 Förster
(Continued)

FOREIGN PATENT DOCUMENTS

DE    197 00 422 C2    12/2003
DE    298 25 002 U1     4/2004
(Continued)

OTHER PUBLICATIONS

French Search Report and Written Opinion for FR 785309; Dated Dec. 4, 2014; 13 pages.
(Continued)

*Primary Examiner* — Valentina Xavier
(74) *Attorney, Agent, or Firm* — Barclay Damon, LLP

(57) ABSTRACT

A damping assembly for a pivoting stowage bin includes a rotary hydraulic damper that is mounted on the pivot axis of the stowage bin. The rotary hydraulic damper includes a damper body that receives a rotor having at least one vane moved through contained hydraulic fluid. Preferably, an exterior bearing surface on the damper precludes the active damping elements from radial loads, while a distributed attachment of the rotor to the pivoting bin enables reduced torque loads. The damper can include an integrated flow-control valve for controlling the opening rate of the pivoting bin as well as an integrated mechanical stop for the bin.

27 Claims, 7 Drawing Sheets

(51) Int. Cl.
  *F16F 9/14* (2006.01)
  *E05F 3/14* (2006.01)

(56) References Cited

U.S. PATENT DOCUMENTS

| | | | |
|---|---|---|---|
| 6,164,592 A | 12/2000 | Stephan et al. | |
| 6,314,612 B1* | 11/2001 | Rennecke et al. | 16/54 |
| 6,622,830 B2* | 9/2003 | Oliver et al. | 188/306 |
| 6,687,921 B1* | 2/2004 | Li | 4/236 |
| 6,840,355 B2* | 1/2005 | Iwashita | 188/290 |
| 7,967,116 B2 | 6/2011 | Boerschig | |
| 8,210,609 B2* | 7/2012 | Okimura et al. | 297/216.12 |
| 2003/0106898 A1* | 6/2003 | Kennedy et al. | 220/825 |
| 2005/0076471 A1 | 4/2005 | Watanabe et al. | |
| 2005/0252740 A1 | 11/2005 | Fukukawa | |
| 2007/0018043 A1* | 1/2007 | Lamoree et al. | 244/118.1 |
| 2008/0078459 A1* | 4/2008 | Warriner et al. | 137/512.1 |
| 2008/0182693 A1* | 7/2008 | Holmes | 475/5 |
| 2009/0079215 A1* | 3/2009 | Shirase | 296/37.12 |
| 2009/0300884 A1* | 12/2009 | Morgan et al. | 16/343 |
| 2010/0084885 A1 | 4/2010 | Townson et al. | |
| 2011/0253837 A1 | 10/2011 | Lee et al. | |
| 2012/0038254 A1 | 2/2012 | Rafler | |
| 2013/0207529 A1* | 8/2013 | Kearsey et al. | 312/248 |
| 2014/0353093 A1* | 12/2014 | Yamane et al. | 188/83 |

FOREIGN PATENT DOCUMENTS

| | | |
|---|---|---|
| DE | 103 13 375 A1 | 10/2004 |
| DE | 603 11 726 T2 | 11/2007 |
| DE | 602 24 584 T2 | 1/2009 |
| DE | 10 2010 034 025 A1 | 2/2012 |
| EP | 1 413 794 A2 | 4/2004 |
| EP | 2 348 228 A1 | 7/2011 |
| WO | WO 2010/141192 A1 | 12/2010 |

OTHER PUBLICATIONS

German Office Action for DE 10 2013 205 373.8; Dated: Dec. 15, 2015; 8 pages.

* cited by examiner

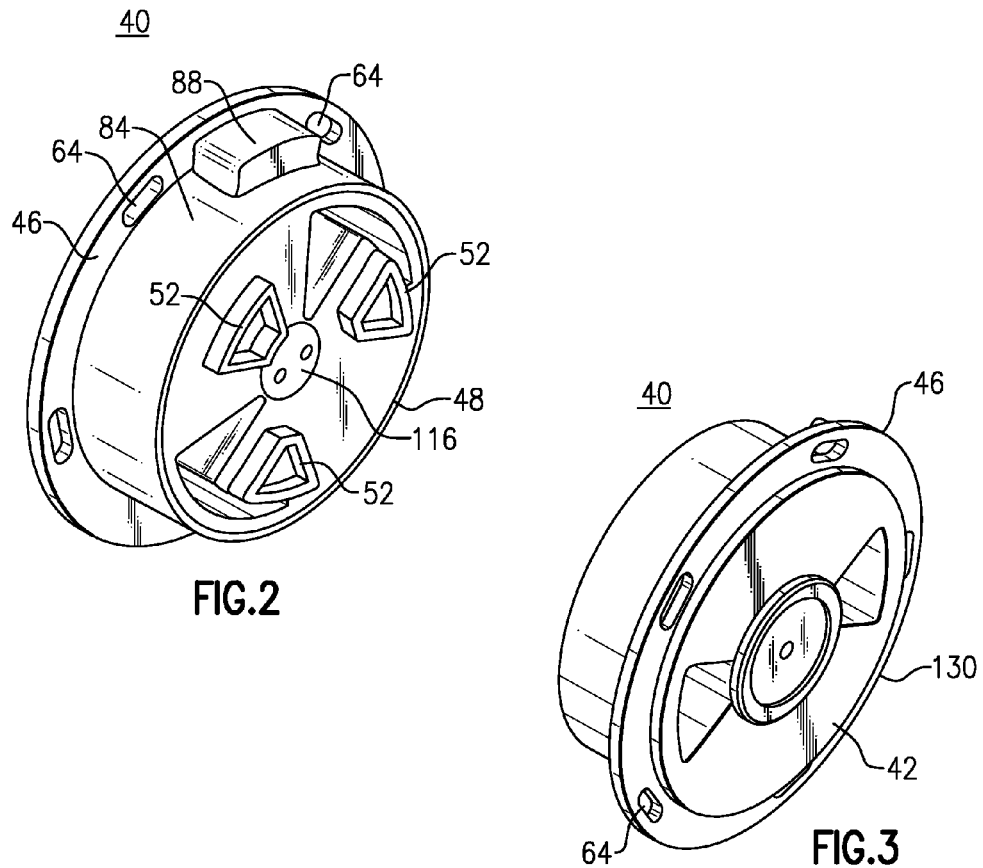
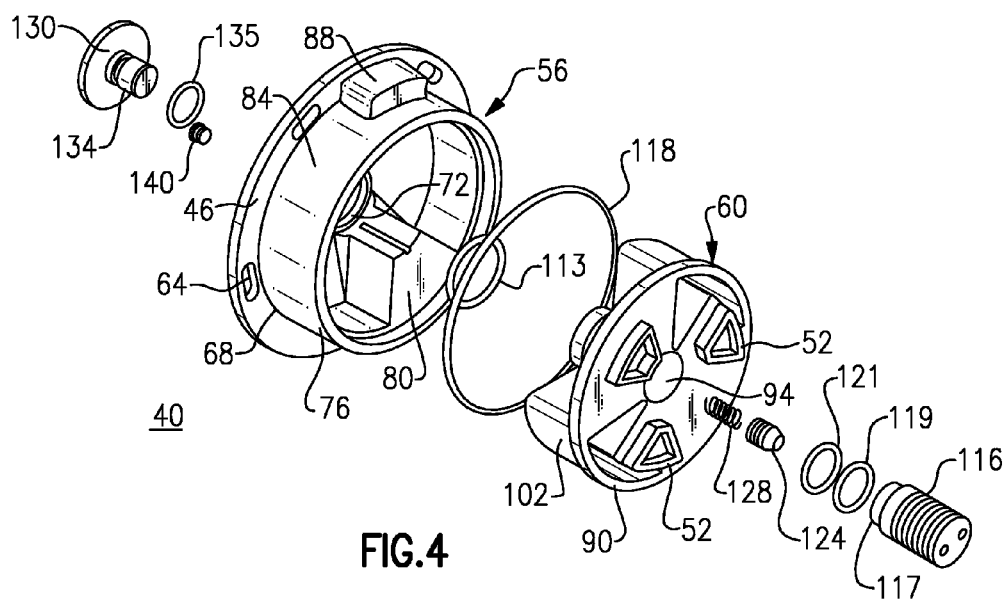

ROTARY HYDRAULIC DAMPER FOR PIVOTING STOWAGE BIN

CROSS REFERENCE TO RELATED APPLICATION

This application claims priority under 35 U.S.C. §119 based on U.S. Ser. No. 61/615,620, filed Mar. 26, 2012, and entitled: Rotary Hydraulic Damper for Pivoting Stowage Bin, the entire contents being herein incorporated by reference.

TECHNICAL FIELD

This disclosure relates generally to the field of damping systems and more specifically to a rotary hydraulic damper for use with a pivoting stowage bin, such as those commonly used in commercial aircraft. More specifically, at least one rotary hydraulic damper can be mounted along the pivot axis of the pivoting stowage bin such that torque loads can be distributed, thereby permitting manufacture using lower cost materials. The rotary hydraulic damper can further be mounted to the pivoting stowage bin such that radial loads are not imparted to the moving elements of the damper. According to one version, the rotary hydraulic damper can include at least one flow control valve that standardizes the opening rate of the bin irrespective of the weight put into the stowage bin, wherein the damper can further include an integrated mechanical stop as well as means for adjusting the open position of the stowage bin.

BACKGROUND AND RELEVANT ART

Stowage bins, such as those provided on commercial aircraft, typically incorporate a pivot assembly at the axis of rotation of the bin bucket. This assembly supports the bin load and allows the bucket to rotate about the axis of rotation in relation to a stationary bin housing.

It is preferred in such assemblies to be able to effectively control the opening rate of the stowage bin. Typical rotary bin dampers are relatively expensive in terms of cost and manufacture, relying upon relatively complex and largely metallic assemblies including a center splined shaft that typically receives both torque and radial loads.

In addition, these rotary bin dampers also typically utilize single fixed orifices, which means that the stowage bin opens inconsistently based on the weight that is actually contained within the bin. That is, the stowage bin opens slowly when the bin is empty as compared to when the bin is full.

It is therefore a general desire in the field to improve the manufacturability of the above-noted damping assemblies as well as to decrease the overall complexity thereof in order to reduce cost, while not sacrificing reliability.

SUMMARY

Therefore and according to a first aspect there is described a damping assembly for a pivoting stowage bin, the assembly comprising a rotary hydraulic damper that is mounted along the pivot axis of the stowage bin, the stowage bin including a bin bucket which is pivotally attached to a stationary bin frame. The rotary hydraulic damper is mounted at one end of the pivot axis and includes a stator and a rotor engaged within the stator. The rotor is mounted for rotation to the pivoting bin bucket about the pivot axis of the bin assembly and the stator is mounted to the bin frame.

In one version, the rotor can include a plurality of keys that are engaged with corresponding keyways formed in a mounting plate of the pivoting bin bucket. The keys are radially positioned relative to the center axis of the damper assembly, which is substantially aligned with the pivot axis of the bin assembly. In this manner, torque loads are distributed away from the center of the damper and therefore lower cost materials, such as moldable plastics, can be utilized for manufacture. In accordance with one version, at least one elastomeric spacer can be provided between the keyed connection of the rotor and the pivoting bucket so as to more evenly distribute the load to the keys, and provide manufacturing gap alignment to prevent rattling from vibratory effects.

In one version, the damper assembly includes at least one flow control valve used for controlling the opening rate of the pivoting bin bucket. The at least one valve can be positioned within the vanes of the rotor, the stator or within a central shaft portion of the damper. In one version, the valve is spring loaded and positioned within an annular cavity to affect the size of orifices between adjacent pressure chambers formed by the rotor and stator vanes of the damper based on the amount of force so as to provide substantially constant angular velocity of the pivoting bin irrespective of the load within the bin.

According to another version, the hydraulic damper is mounted to the bin such that an annular exterior bearing surface of the damper body accepts substantially all radial loads imparted to the assembly wherein the moving components of the rotary hydraulic damper receives only torque loads.

According to yet another version, the herein described damper assembly can further include at least one integrated feature for creating a mechanical stop position for the bin when fully opened. In one version, the damper body includes at least one stop lug that is engaged with a slotted portion of a mounting bracket of the pivoting bin. Additionally, means can be provided for adjusting the stop position, for example, relative to adjacent bin assemblies. According to one version, a plurality of mounting holes on the mounting bracket can be slotted to provide adjustability.

The rotary hydraulic damper according to one version can include a damper body that is stationarily attached to the bin housing and a rotor mounted for rotation within said damper body, each of the damper body and the rotor including at least one vane forming a plurality of variable interior fluidic chambers. The rotor is attached to the pivoting bucket and is caused to move rotationally about the pivot axis when the bin is opened and closed. According to one version, the rotor can be attached to the bucket by a keyed arrangement. Rotational movement of the rotor within the damper body causes movement of contained hydraulic fluid between the variable fluidic chambers.

The flow control valve according to one version can include an axial valve member that is disposed within a manifold disposed within a center axis of the damper, wherein a bias spring can be disposed in operative association with the axial valve member. The manifold defines a subchamber between high and low pressure sides of the damper. In brief, the flow control valve provides constant angular velocity of the rotor in response to the application of a load from the pivoting bucket by metering the flow of hydraulic fluid from a first chamber of the damper on a high pressure side to a second chamber defined on a low pressure side thereof.

According to another aspect, there is described a hydraulic rotary damping assembly for use in a pivoting bin, the bin including a bucket pivotally attached to a stationary housing, the damping assembly comprising:

a hydraulic damper disposed along the pivot axis of the pivoting bin; and a weight compensated valve disposed within the hydraulic damper for controlling the opening rate of the bucket.

In terms of advantages, a traditional hydraulic rotary damper typically has a splined axial input shaft in the center of the damper to accept the transmitted torque. Because the torque is applied at the center of the damper, expensive metal components are required in order to withstand the stresses from the torque at the center of the damper. By moving the transmitted torque away from the center of the damper according to the present assembly, the stresses are effectively reduced, and therefore other lightweight and less expensive materials, such as plastic, can be suitably utilized to transmit the torque.

In addition, traditional hydraulic rotary dampers also typically employ bearings around the splined input shaft to support the radial loads from the stowage bin and its contents. As a consequence, the moving vanes of this damper design would therefore encounter both torque and radial loads. By utilizing the exterior surface of the damper body as the bearing surface for any radial loads, the moving damper vanes will only encounter torque, thereby extending the overall life of the damper and the pivoting bin assembly. The foregoing also keeps the thickness of the damper to a minimum since long internal bearings are not required.

Still further, the incorporation of a positive mechanical stop on the outside of the damper body minimizes the loads on the stop due to its distance away from the axis of rotation. The positioning of this stop advantageously allows the use of lower cost materials, such as plastic, and further allows the bin designer to eliminate the manufacture of separate stop elements in the assembly.

Still further, a traditional hydraulic damper utilizes a single orifice to provide the needed damping force from the fluid. In these types of applications, the bin will open slowly when empty and much faster when the bin is fully weighted. By incorporating a flow control valve within the damper in accordance with the herein described assembly, the opening time of the stowage bin can be effectively controlled and standardized irrespective of the amount of loading therein.

These and other features and advantages will become readily apparent from the following Detailed Description, which should be read in conjunction with the accompanying drawings.

BRIEF DESCRIPTION OF THE DRAWINGS

FIG. 2 is a rear perspective view of a rotary hydraulic damper made in accordance with an exemplary embodiment;

FIG. 3 is a front perspective view of the rotary hydraulic damper of FIG. 2;

FIG. 4 is an exploded assembly view of the rotary hydraulic damper of FIGS. 2 and 3, as shown in rear perspective;

DETAILED DESCRIPTION

The following relates to an exemplary embodiment of a rotary hydraulic damper assembly used in conjunction with a pivoting stowage bin, such as those typically found on commercial aircraft. It will be readily apparent, however, that numerous other variations and modifications are possible that generally embody the inventive concepts described herein. Moreover, it will also be readily apparent that these concepts may also be similarly applied to other related fields of endeavor. During the course of discussion, certain terms such as "distal", "proximal", "inner", "outer", "lateral", "internal" and "external", among others are used for purposes of providing a suitable frame of reference in regard to the accompanying drawings. These terms are not intended to be overly limiting of the inventive concepts described herein, however, unless otherwise specifically indicated.

In addition, the accompanying drawings are intended to convey the inventive concepts more readily, but the drawings themselves are not drawn necessarily to scale and should not be relied upon in that regard.

Figure 1:
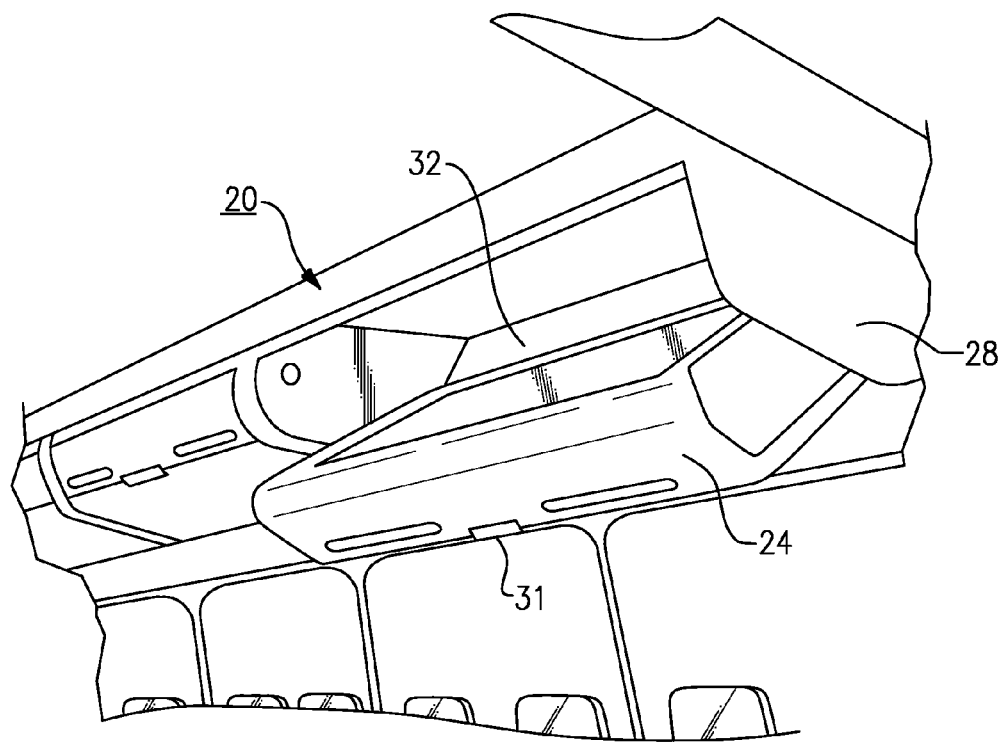
FIG. 1 is a perspective view of a prior art pivoting stowage bin.

For purposes of background, a prior art stowage bin is shown according to FIG. 1 to which the rotary hydraulic damper described herein can be applied. The stowage bin 20 includes a bin bucket 24, which is hingably connected at a pair of opposing lateral ends to a stationary bin housing 28. Other suitable pivoting stowage bin assemblies having different bin bucket configurations are described by way of example, in U.S. Patent Application Publication No. 2011/0253837A1, the relevant contents of which are herein incorporated by reference. The bin housing 28 is fixedly attached to the aircraft frame at each lateral end in order to form respective bin walls wherein the lateral walls of the bin bucket 24 are pivotally attached through a mounting arrangement to respective parallel walls of the stationary housing, therein providing the pivot location for the stowage bin 20. When assembled, the interior of the bin bucket 24 and bin housing 28 combine to define an enclosure 32 wherein the bin bucket further includes an exterior latch 31 to enable the stowage bin 20 to be selectively opened and closed by a user. In use, the bin bucket 24 is released from a latched position (not shown in this view) by the latch 31 and caused to pivot through an attached mounting arrangement relative to the stationary housing 28 to an open position, as shown, presenting the enclosure 32 for either placement or removing of luggage (not shown). Additional details of exemplary stowage bins are provided in the above cross-referenced publication.

According to the present exemplary embodiment and referring to FIGS. 2 and 3, a pair of rotary hydraulic dampers 40 are attached to each end of a stowage bin, such as the one shown by way of example according to FIG. 1, wherein each of the dampers 40 are disposed along the pivot axis of the stowage bin in a mounting arrangement between the bin bucket 24, FIG. 1, and the stationary bin housing 28, FIG. 1. For purposes of this discussion, only a single rotary hydraulic damper 40 is described and shown herein and in which the remaining damper is essentially a mirror image thereof in terms of its structure, functionality and mounting arrangement. It should be noted, however, that in an alternative embodiment, a single rotary hinge damper could be provided in lieu of separate rotary hydraulic dampers at each opposing lateral end of the stowage bin 20.

The rotary hydraulic damper 40 according to this embodiment and shown in assembled form in FIGS. 2 and 3 is defined by a distal end 42 that is attachable to the stationary bin housing 28, FIG. 1, using a mounting flange 46 and an opposing proximal end 48 that is separately connectable to the pivoting bin bucket 24, FIG. 1, using a set of circumferentially spaced keys 52, as described in greater detail in a later section. The relative positioning of the damper 40 according to this embodiment is based upon a stowage bin design that includes a pivoting bin 24, FIG. 1, forming the interior member relative to an exterior bin housing 28, FIG. 1. It will be readily apparent that the relative distal and proximal ends 42, 48 of the hydraulic rotary damper 40 can be reversed, for example, depending on the structure of the pivoting stowage bin for purposes of mounting.

Figure 5:
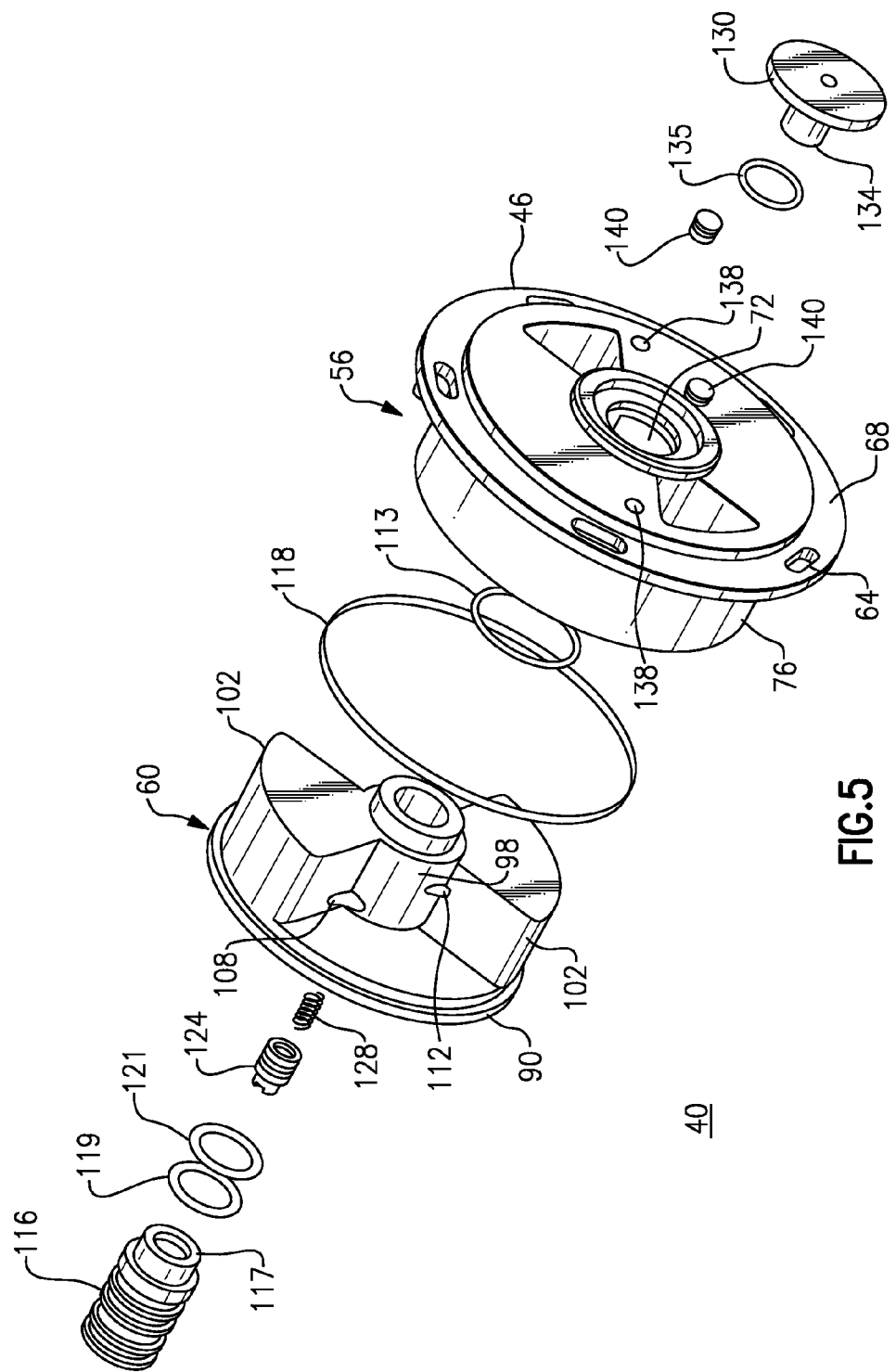
FIG. 5 is an exploded assembly view of the rotary hydraulic damper of FIGS. 2-4, as shown in front perspective.

As shown in FIGS. 4 and 5, the rotary hydraulic damper 40 is essentially a two-part structure comprising a damper body 56 having an interior cavity that is sized to receive a rotor 60 that is mounted for rotation therein. The damper body 56 according to this embodiment includes the mounting flange 46 at a distal end or side thereof, wherein the mounting flange includes a plurality of circumferentially spaced slots 64 disposed along an outer radial portion 68 thereof, as well as a center opening 72. An open-ended cylindrical sleeve portion 76 extending axially from a rear side of the mounting flange 46 defines the interior cavity of the damper body 56, which is hollow with the exception of a pair of diametrically opposed and substantially wedge-shaped vanes 80, each tapering inwardly from the interior diameter of the sleeve portion 76 to the center opening 72 of the mounting flange 46. The exterior surface 84 of the sleeve portion 76 of the damper body 56 is substantially cylindrical with the exception of a stop lug 88 formed as an axial extension of the outer radial portion 68 of the mounting flange 46 and in which the outer radial portion extends radially outward from the exterior diameter of the cylindrical sleeve portion 76.

Still referring to FIGS. 4 and 5, the rotor 60 according to this embodiment is sized for engagement within the open-ended cylindrical sleeve portion 76 of the damper body 56. The rear or proximal end of the rotor 60 is defined by a circular plate 90 having the set of circumferentially disposed keys 52 formed thereon, as well as having a center opening 94. Each of the keys 52 are substantially wedge-shaped and are disposed at an intermediate radius from a center opening 94. The front side or end of the rotor 60 includes an axially extending cored center section 98 as well as a pair of radially extending vanes 102, the vanes tapering outwardly from the cored center section 98 to an outer radius that is substantially equal to that of the rear circular plate 90. The rotor 60 is inserted into the open-ended sleeve portion 76 of the damper body 56 such that the cored center section 98 extends between the diametrically opposed vanes 80 of the damper body 56 and in which the vanes 102 of the rotor 60 are fitted between the vanes 80 of the damper body 56, therein defining a set of variably sized hydraulic chambers. This set of chambers varies in number between two and four hydraulic chambers, depending on the position of the rotor vanes 102. It will be readily apparent that the overall number and shapes of the vanes 80, 102 utilized can be suitably configured as needed. The cored center section 98 further includes a corresponding number of small lateral openings or orifices defined therein, each axially and radially spaced apart. According to this specific embodiment, two (2) pairs of openings are defined, including a pair of first openings or orifices 108 and a spaced pair of second openings 112. Each of the defined orifices 108, 112 is configured in relation to a defined interior hydraulic chamber of the damper 40. In terms of the present drawings, only single openings of each pair 108, 112 are depicted in FIGS. 4 and 5. When assembled, a pair of seal members 118, 113, such as elastomeric O-rings, provide sealing interface between respective outer and inner interior flange surfaces of the rotor 60 and damper body 56, as shown most clearly in an assembled condition in FIG. 10.

Figure 9:
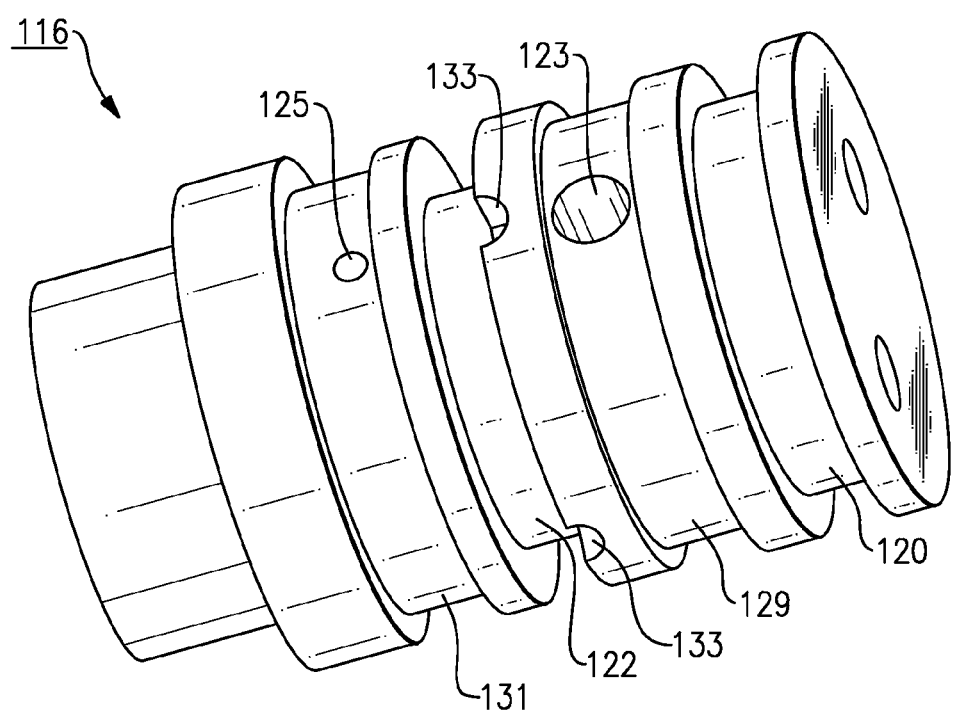
FIG. 9 is an enlarged side elevational view of a manifold used in the rotary hydraulic damper of FIGS. 2-8.

According to this embodiment, a manifold 116 is sized to be slidingly fitted within the cored center section 98 of the assembled rotor 60. As shown in FIG. 9, the manifold 116 is defined by a substantially cylindrical body member having a plurality of grooves 120, 122 that receive sealing members 119, 121, FIGS. 4, 5, as well as a set of lateral openings 123, 125 disposed within adjacent grooves 129, 131, the openings being aligned with the openings 108, 110 of the damper 40 when the rotor is rotated within the damper body 56. A valve element 124 is axially disposed within the subchamber that is defined by the interior of the manifold along with a bias spring 128 operative associated with the valve element as described in a later section. The manifold 116 is fixedly maintained by a retainer member 130 that is mounted through the center opening 72 of the damper body 56 from the distal side. The retainer member 130 includes a threaded distal portion 134 that is configured and sized to engage an internally threaded end 117 of the manifold 116, thereby retaining the components of the herein described damper assembly.

The distal side of the herein described damper body 56 further includes a pair of small openings 138 extending into the defined cavities and permitting the inclusion of fill plugs 140 to enable a quantity of suitable hydraulic fluid (not shown) to be added to the defined interior hydraulic chambers following assembly of the damper 40.

Figure 6:
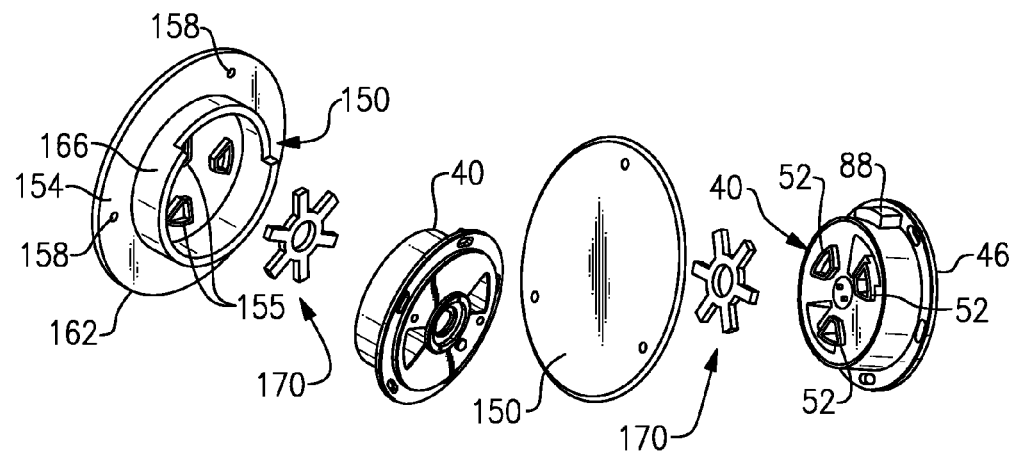
FIG. 6 depicts an exploded mounting arrangement of the rotary hydraulic damper of FIGS. 2-5, including a mounting configuration for a pivoting bin assembly, this depiction being shown in side by side front and rear perspective views.

Referring to FIG. 6 and in terms of mounting the herein described rotary hydraulic damper 40 to the pivoting bin, aligned openings (not shown) are provided in each of the bin bucket 24, FIG. 1, and the bin housing 28, FIG. 1, along the pivot axis. A pivoting mounting plate 150 is fixedly attached to the bin bucket 24, FIG. 1. The mounting plate 150 according to this embodiment includes a rear mounting bracket 154 having a plurality of circumferentially spaced mounting holes 158 along an outer radial portion 162, and an axially extending and open-ended receiving portion 166 which is substantially cylindrical in configuration and defined by an interior diameter that is sized to correspondingly mate with the exterior diameter of the sleeve portion 76 of the damper body 56. The mounting plate 150 further includes a set of features configured to engage the keys 52 on the proximal side of the rotor 60. According to this embodiment, three (3) keys 155 are utilized, each of the keys being substantially wedge-shaped and symmetrically disposed about at an intermediate radial distance from the center of the bracket 154 and wherein a spacer 170 is introduced into the receiving portion 166 thereof. In this embodiment, the spacer 170 and corresponding keys 155 on the front side of the mounting bracket 150 combine to form a set of keyways that engage the keys 52 of the rotor 60. The spacer 170 is preferably elastomeric in order to take up manufacturing tolerances and also provide manufacturing gap alignment and minimize rattling or vibratory effects on the pivoting bin.

The mounting flange 46 of the damper body 56 is fixedly attached to the bin housing 28, FIG. 1, using fasteners (not shown) secured through the mounting slots 64 formed on the outer radial portion 68 and the bin housing 28, FIG. 1, respectively. When assembled, the damper body 56 extends through an opening (not shown) of the stationary bin housing 28, FIG.

1, such that the outer diameter of the damper body is secured within the inner diameter of the opening.

As the pivoting bin bucket 24, FIG. 1, rotates, the mounting plate engagement with the keys 52 causes the rotor 60 to rotate with the bin bucket 24, FIG. 1, and within the interior of the damper body 56 while the damper body remains stationarily mounted to the bin housing 28, FIG. 1.

Figures 7, 8:
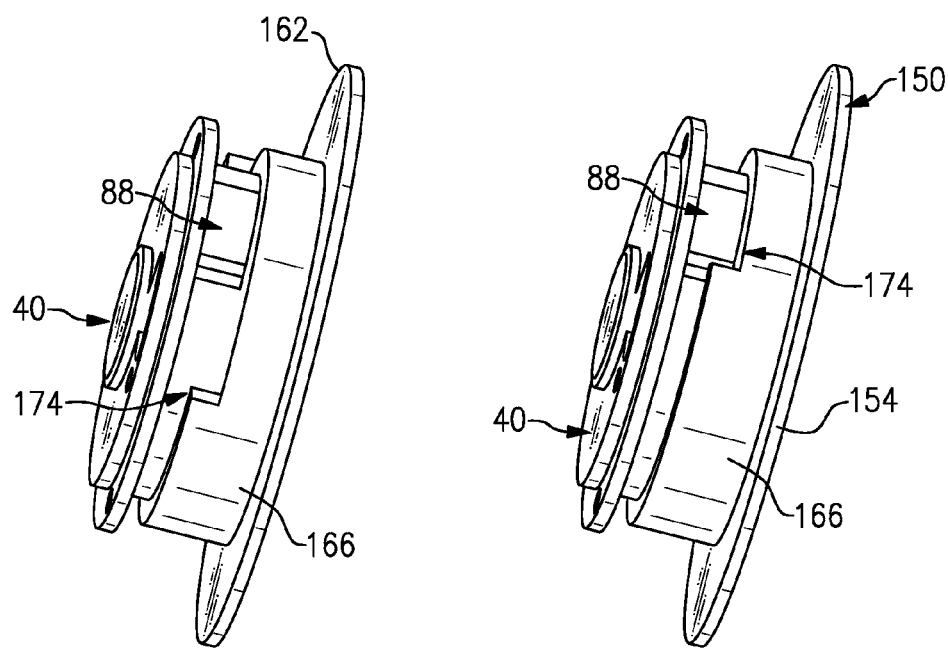
FIGS. 7 and 8 are perspective views of the mounting arrangement of the rotary hydraulic damper of FIG. 6, illustrating an integrated mechanical stop feature.

Referring to FIGS. 7 and 8, the receiving portion 162 of the pivoting mounting plate 150 further includes a slot 174 that is cut axially from an outer surface over a circumferential section thereof. The purpose of this slot 174 is to provide a mechanical stop for the bin bucket 24. That is and as the pivoting bin 24, FIG. 1, is pivoted on opening, the mounting plate and attached rotor are caused to rotate between the positions shown in FIGS. 7 and 8 until the stop lug 88 encounters the end of the slot 174.

Figure 10:
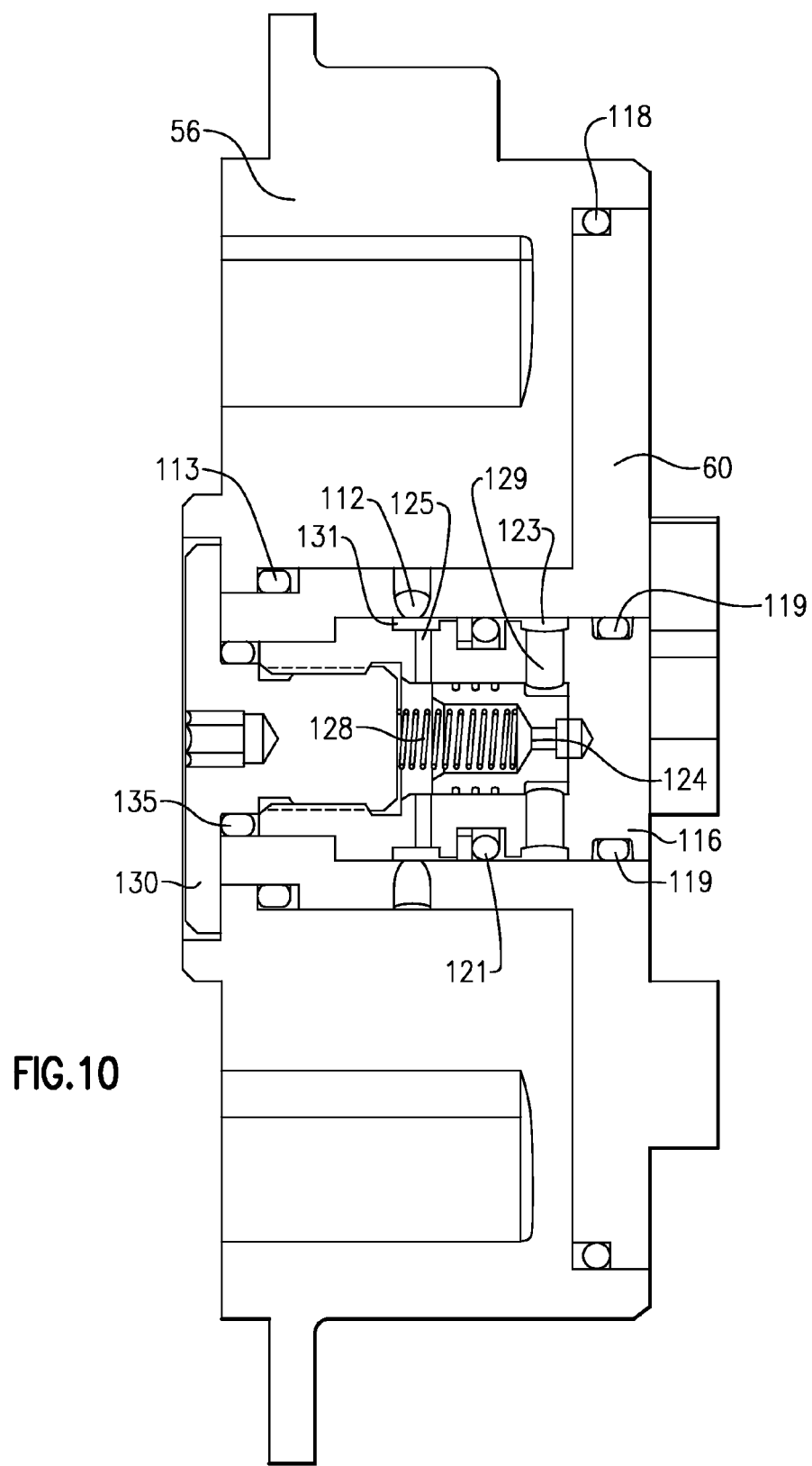
FIG. 10 is a sectioned side view of the rotary hydraulic damper of FIGS. 2-9 including an integrated flow control valve in accordance with one exemplary embodiment.
Figure 11:
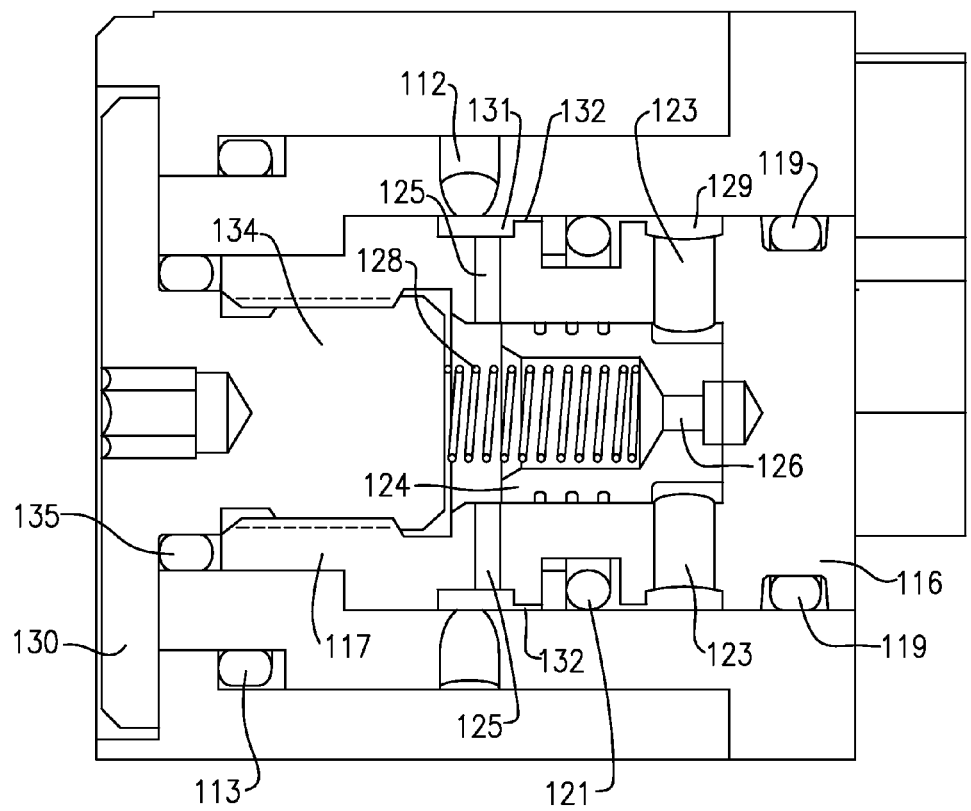
FIG. 11 is an enlarged view of a portion of the flow control valve of FIG. 10 as operatively used.

Referring to FIGS. 9-11, discussion is herein made of the flow control (weight compensating) valve used in accordance with this exemplary embodiment.

As previously noted, the central cored section 98 of the herein described rotary hydraulic damper 40 includes a first set of holes 108 and an adjacent second set of holes 112, each spaced to provide high pressure and low pressure regions in terms of movement of contained hydraulic fluid through the defined hydraulic chambers within the damper. According to this embodiment, and as the bin bucket 24, FIG. 1, is opened, the bucket is caused to pivot about the pivot axis, thereby causing the rotor 60 to rotate based on the keyed connection to the pivoting bin mounting plate 150. Relative movement of the rotor vanes 102 within the damper 40 therefore causes contained hydraulic fluid to be moved under high pressure through the inlet holes 108 of the cored section 98 towards the opposing low pressure regions or chambers thereof and into the subchamber defined by the interior of the manifold 116, in which fluid is caused to enter the subchamber as fluid flows through holes 108 and into holes 123 via the exterior groove 129 along a defined first fluid flow path.

The interposed valve element 124 is biased by the axially disposed spring 128 against that of the moving fluid in regard to the inlet holes 123. As the hydraulic fluid pushes against the force of the biased spring 128 based on a pressure gradient developed as the fluid flows through an intermediate orifice 126 in the valve element 124, the valve element 124 is moved towards the outlet orifices 125, and partially cuts off fluid flow through the outlet orifices 125, substantially creating a constant rate of fluid flow irrespective of the force applied due to the compensating effect of the spring 128. Details as to the theory of this specific valve are provided in U.S. Pat. No. 7,967,116, the entire contents of which are herein incorporated by reference. During opening of the bin bucket 24 and once the hydraulic fluid flows through the outlet orifices 125, this fluid flows into the groove 131 of the manifold 116 and then exits through the holes 112 into the low pressure region created by the rotor vanes 102 and stator vanes 80.

The preceding description relates to a central axial positioning of the flow control valve for purposes of this exemplary embodiment. However, there are alternative configurations that could easily be realized. For example, separate flow control valves employing the preceding principles could be positioned in relation to each of the rotor vanes or stator vanes. In addition, modifications can be optionally included due to the spring loaded nature of the herein-described flow control valve and the accessibility of the manifold 116. For example, an adjustment feature (not shown) can be added so adjustments can be made to the preload of the spring 128 to change the flow rate of fluid through the valve, thereby changing the opening rate of the bin bucket 24. In addition, adjustments can be made mechanically to the herein described system regarding the return path of fluid, for example, allowing additional fluid to flow to make closing the bin bucket easier. When closing the bin bucket 24, the rotor 60 will rotate in the opposite direction causing fluid within the damper to flow in the direct opposite direction. Additional fluid flow can be created through the use of a check valve, which opens when closing the bin. This additional fluid flow causes the damper to create less resistance to movement, thus making it easier to close the bin bucket 24. An embodiment of this valve is shown in FIG. 11. As fluid flows into hole 112 and into the groove 131 of the manifold 116, fluid can flow through the annular area 132 and force the sealing member 121 to move away from the annular area 132. Cylindrical sections 133, FIG. 9, cut away from the wall in the manifold 116 prevent the sealing member 121 from sealing against the wall and thus allows fluid to flow under the sealing member 121, through the cylindrical sections 133 into groove 129 and then exiting through the openings 108 formed in the damper and into the low pressure region created by the rotor vanes 102 and stator vanes 80.

Additional details concerning various linear versions of the preceding valve structure are provided in previously incorporated U.S. Pat. No. 7,967,116.

By attaching the rotary hydraulic damper in the manner described herein and along the pivot axis of the stowage bin 20, FIG. 1, such as by distributing the torque loads away by eliminating the traditional splined shaft common to most dampers, the major components of the damper can be suitably manufactured from lightweight and more inexpensive materials, such as moldable plastics. As a result, manufacturing costs are significantly reduced. In addition, the removal of a splined shaft from the center of the herein described damper permits the inclusion of the load compensating valve without significant impact to the footprint. As a result, additional functionality is provided to the herein described assembly.

PARTS LIST FOR FIGS. 1-11

20 stowage bin
24 bin bucket
28 bin housing
31 latch, exterior
32 enclosure
40 rotary hydraulic damper
42 distal end, damper
46 mounting flange, damper
48 proximal end, damper
52 keys, circumferentially disposed
56 damper body
60 rotor
64 slots
68 outer radial portion, body
72 center opening, body
76 open-ended sleeve portion
80 vanes, damper body
84 exterior surface, sleeve portion
88 stop lug
90 circular plate, rotor
94 center opening, rotor
98 cored center section, rotor
102 vanes, rotor
108 opening or orifice
112 opening or orifice
113 sealing member
116 manifold
117 threaded end, manifold 118 seal member
119 sealing member
120 groove
121 sealing member
122 groove
123 lateral opening
124 valve element
125 lateral opening
126 intermediate orifice
128 bias spring
129 groove
130 retainer member
131 groove
132 annular area
133 cylindrical sections
134 distal threaded portion, retainer member
135 sealing member
138 openings, fill
140 fill plugs
150 mounting plate, pivoting bin bucket
154 rear mounting bracket
155 keys
158 mounting holes
162 outer radial portion
166 axial extending rear portion
170 spacer
174 slot Although exemplary embodiments have been described herein, it will be readily apparent that there are numerous variations and modifications that could be further employed in the furtherance of the inventive concepts described herein and according to the following claims.

The invention claimed is:

1. A rotary hydraulic damper assembly for use in a pivoting bin, said damper assembly comprising:
   a damper body having an interior cavity and at least one integrally disposed vane;
   a rotor configured for movement with the pivoting bin and disposed within the interior cavity and supported for rotation therein, the rotor having a cored center portion and at least one integral vane extending radially from the cored center section, said interior cavity further retaining hydraulic fluid in which the integral vanes of the rotor and the damper body define a plurality of interior pressure chambers within the interior cavity of the damper body and in which a number of lateral orifices are further disposed within the cored center section for interconnecting the defined pressure chambers, said damper assembly being disposed along a pivot axis of said pivoting bin; and
   a flow control valve configured for variably controlling the size of the lateral orifices during movement of the pivoting bin, said flow control valve being positioned in a manifold disposed within the cored center portion of the rotor, said manifold including at least two laterally spaced orifices for conducting fluid between the interior pressure chambers as said rotor is caused to rotate within said interior cavity, said flow control valve comprising a biased valve element movable to vary the effective area of the defined orifices as said bin is opened and creating a constant flow rate therebetween.

2. A rotary hydraulic damper assembly as recited in claim 1, wherein said pivoting bin includes a bin bucket pivotally attached to a stationary bin housing, said rotor being fixedly attached to said pivoting bin and said damper body fixedly attached to said stationary bin housing.

3. A rotary hydraulic assembly as recited in claim 1, wherein said pivoting bin includes a bin bucket pivotally attached to a stationary bin housing, said rotor being attached to said stationary bin housing and said damper body being attached to said pivoting bin.

4. A rotary hydraulic damper assembly as recited in claim 2, wherein said rotor includes a plurality of engagement features, said assembly including a mounting plate attached to a lateral end wall of said pivoting bin bucket and having complementary engagement features for engaging said rotor and in which said engagement features are circumferentially spaced.

5. A rotary hydraulic damper assembly as recited in claim 4, wherein said engagement features are radially disposed from the center of said damper body to support radial loads.

6. A rotary hydraulic damper assembly as recited in claim 4, in which at least one annular portion of said damper body is received within an annular portion of said mounting plate creating bearing surfaces between said damper body and said mounting plate.

7. A rotary hydraulic damper assembly as recited in claim 5, including an integrated stop for said pivoting bin wherein said annular portion of said damper body includes a stop lug engageable with a slot formed in the annular portion of said mounting plate.

8. A rotary hydraulic damper assembly as recited in claim 1, further comprising means for controlling the opening rate of said pivoting bin.

9. A rotary hydraulic damping assembly for use in a pivoting bin, said bin including a bin bucket pivotally attached to a stationary housing, said damping assembly comprising:
   a hydraulic damper disposed along the pivot axis of said bin, the damper comprising:
      a damper body having an interior cavity and at least one integrally disposed vane; and
      a rotor configured for movement with the pivoting bin and disposed within the interior cavity and supported for rotation therein, the rotor having a integral cored center portion having at least one vane extending radially from the cored center section, the interior cavity further retaining hydraulic fluid in which the vanes of the rotor and the damper body define a plurality of interior pressure chambers and in which a number of lateral orifices are disposed within the cored center portion for interconnecting the defined pressure chambers; and
   a load compensating valve disposed within said hydraulic damper for controlling the opening rate of said bin bucket by controlling the flow of retained hydraulic fluid between the interior pressure chambers, said valve being disposed in a manifold disposed within the cored center portion of the rotor, said manifold including at least two laterally spaced orifices for conducting fluid between said pressure chambers as said rotor is caused to rotate within said interior cavity, said valve comprising a biased valve element movable to vary the effective area of a defined orifice as said bin is opened and creating a substantially constant flow rate.

10. A rotary hydraulic damping assembly as recited in claim 9, wherein the damper body has an exterior surface having at least one integrated stop feature that cooperates with said bin bucket to create a mechanical stop when opened.

11. A rotary hydraulic damping assembly as recited in claim 9, wherein the rotor is attached to said pivoting bin bucket along the pivot axis of said stowage bin.

12. A rotary hydraulic damping assembly as recited in claim 11, wherein said rotor includes a plurality of keys for engaging corresponding keyways formed in said bin bucket.

13. A rotary hydraulic damping assembly as recited in claim 12, including a mounting plate attached to said pivoting bin for receiving said rotor, said mounting plate having engagement features for engaging said keys.

14. A rotary hydraulic damping assembly as recited in claim 13, including a spacer disposed between said keys and said engagement features.

15. A rotary hydraulic damping assembly as recited in claim 14, wherein said spacer is made from an elastomeric material.

16. A rotary hydraulic damping assembly as recited in claim 1, wherein a said hydraulic damper is disposed at opposing lateral ends of said stowage bin.

17. A rotary hydraulic damping assembly for use with a pivoting stowage bin, said stowage bin including a pivoting bin bucket mounted to a stationary bin housing, said damping assembly comprising:
  a damper body aligned along the pivot axis of said bin, the damper body having an interior cavity having at least one vane disposed therein;
  a rotor mounted for rotation within the interior cavity of said damper body and having an integral cored center portion having at least one vane extending radially therefrom and in which the vanes of the damper body and rotor define interior pressure chambers, the interior cavity containing a hydraulic fluid, the cored center portion having a number of lateral orifices interconnecting the interior pressure chambers;
  a flow control valve that is configured for varying the size of the lateral orifices based on rotation of the pivoting bin; and
  a mounting plate secured to a lateral end of said pivoting bin bucket and in which said rotor is attached to said pivoting bin bucket and said damper body is attached to said stationary bin housing, said mounting plate having a cylindrical receiving portion sized for receiving a annular portion of said damper body including said contained rotor and in which the exterior surface of said annular portion and the interior surface of said cylindrical receiving portion form respective bearing surfaces such that the moving components of said damper do not receive imparted radial loads.

18. A rotary damping assembly as recited in claim 17, including an integrated stop feature for defining a stop position of said pivoting bin.

19. A rotary damping assembly as recited in claim 18, wherein said annular portion of said damper body includes a stop lug for engaging a slot provided in said cylindrical receiving portion.

20. A rotary damping assembly as recited in claim 17, in which the flow control valve regulates the opening rate of said bin bucket to a nearly constant rate over a wide range of bin loads.

21. A rotary damping assembly as recited in claim 20, wherein the flow control valve is disposed within a manifold disposed within the cored center portion of the rotor, the manifold having a plurality of laterally defined orifices that are aligned with the orifices of the cored center section.

22. A rotary damping assembly as recited in claim 17, wherein said damper body and said rotor are made from a moldable plastic.

23. A rotary damping assembly as recited in claim 21, wherein said flow control valve can be externally adjusted.

24. A rotary damping assembly as recited in claim 21, wherein said flow control valve is spring biased to produce said nearly constant opening rate, and in which said valve acts as a free flow valve upon closing of said bin.

25. A rotary damper assembly for use on a stowage bin assembly in which the stowage bin assembly comprises a pivoting stowage bin retained for movement within a fixed bin housing, the rotary damper assembly comprising:
  a damper body having an interior cavity and at least one disposed vane within the interior cavity;
  a rotor disposed within the interior cavity, the rotor being made from plastic and comprising a cored center portion extending from one side of the rotor that includes at least one radially extending integral vane; and
  a mounting plate mounted to one of the rotor and the damper body and configured for attachment to the pivoting storage bin, and the other of the rotor and damper body being attached to the fixed bin housing such that a primary axis of the damper assembly is aligned with a pivot axis of the stowage bin in which the interior cavity retains a quantity of hydraulic fluid, the vanes of the damper body and the rotor defining at least two fluid chambers and in which the cored center portion includes a plurality of lateral orifices interconnecting the fluid chambers wherein the mounting plate is fixedly attached to the pivoting stowage bin and wherein relative movement between the rotor and the damper body occurs based on pivoting movement of the stowage bin along the pivot axis and in which torque loads are distributed away from the center of the damper assembly.

26. The damper assembly as recited in claim 25, further comprising a plurality of engagement features disposed on mating surfaces of the mounting plate and the rotor or damper damper, the engagement features being disposed relative to the center axis of the damper assembly for distributing torque loads away from the center of the damper.

27. The damper assembly as recited in claim 26, wherein the plurality of engagement features comprise a plurality of keys on one of the mating surfaces and a corresponding plurality of keyways on the other mating surface.

* * * * *